(12) United States Patent
Inui

(10) Patent No.: US 9,076,088 B2
(45) Date of Patent: Jul. 7, 2015

(54) IMAGE FORMING APPARATUS, CONTROL METHOD OF IMAGE FORMING APPARATUS, AND STORAGE MEDIUM

(71) Applicant: CANON KABUSHIKI KAISHA, Tokyo (JP)

(72) Inventor: Masanobu Inui, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 118 days.

(21) Appl. No.: 13/741,185

(22) Filed: Jan. 14, 2013

(65) Prior Publication Data

US 2013/0182270 A1 Jul. 18, 2013

(30) Foreign Application Priority Data

Jan. 16, 2012 (JP) .................................. 2012-006045

(51) Int. Cl.
*G06F 15/00* (2006.01)
*G06K 15/02* (2006.01)
*G06K 15/00* (2006.01)
*H04N 1/00* (2006.01)
*H04N 1/23* (2006.01)
*H04N 1/04* (2006.01)

(52) U.S. Cl.
CPC .............. *G06K 15/02* (2013.01); *G06K 15/002* (2013.01); *G06K 15/4065* (2013.01); *H04N 1/00411* (2013.01); *H04N 1/00424* (2013.01); *H04N 1/00474* (2013.01); *H04N 1/00482* (2013.01); *H04N 1/2323* (2013.01); *H04N 1/233* (2013.01); *H04N 1/2338* (2013.01); *H04N 1/2353* (2013.01); *H04N 1/2369* (2013.01); *H04N 2201/0094* (2013.01)

(58) Field of Classification Search
CPC ... G06F 12/02; G06F 15/002; G06F 15/4065; H04N 1/00411; H04N 1/00424; H04N 1/00474; H04N 1/00482; H04N 1/2323; H04N 1/233; H04N 1/2338; H04N 1/2353; H04N 1/2369; H04N 2201/0094
USPC ............. 358/1.1, 1.4, 1.5, 1.6, 1.9, 1.12, 496, 358/497, 498, 505
See application file for complete search history.

(56) References Cited

FOREIGN PATENT DOCUMENTS

| CN | 1439938 | A | 9/2003 |
| CN | 101576725 | A | 11/2009 |
| EP | 0881825 | A2 | 12/1998 |
| JP | 11-003001 | A | 1/1999 |

*Primary Examiner* — Thierry L Pham
(74) *Attorney, Agent, or Firm* — Canon USA, Inc., IP Division

(57) ABSTRACT

A user is unable to confirm whether a sheet for color printing and a sheet for monochromatic printing may be mixed before executing a job.

10 Claims, 11 Drawing Sheets

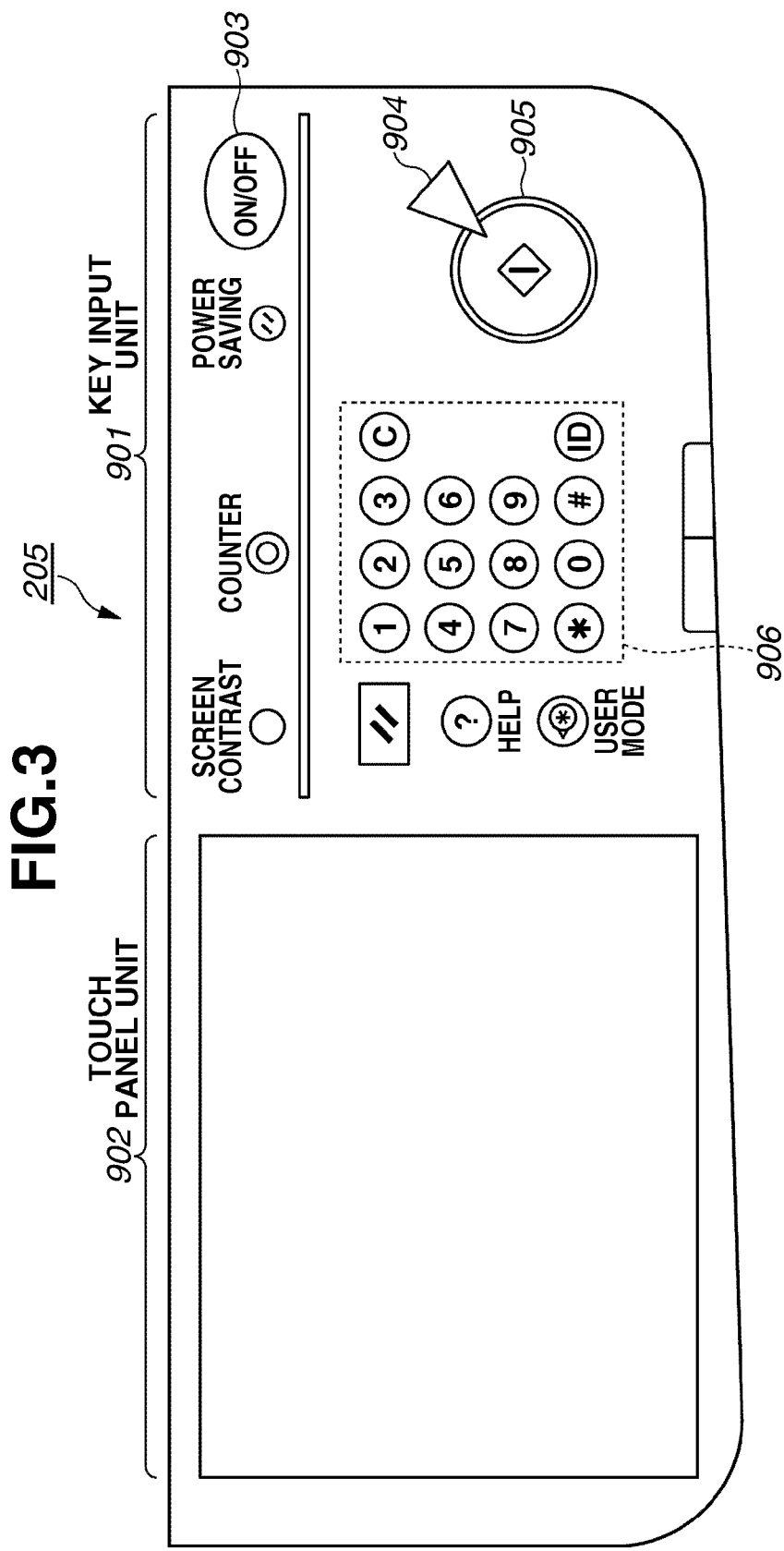

FIG.5A

| USER MODE | |
|---|---|
| AUTO CASSETTE SELECTION ON/OFF | ☐ |
| AUTO CASSETTE SELECTION BY COLOR SELECTION | ☐ |
| PRIORITIZE IMAGE ORIENTATION | ☐ |
| REGISTER PAPER TYPE | ☐ |
| AUTO ROTATE PORTRAIT/LANDSCAPE | ☐ |

AUTO CASSETTE SELECTION ON/OFF

| | OFF | ON |
|---|---|---|
| CASSETTE 1  A4 | OFF | ON |
| CASSETTE 2  A3 | OFF | ON |
| CASSETTE 3  B5 | OFF | ON |
| CASSETTE 4  B4 | OFF | ON |

AUTO CASSETTE SELECTION BY COLOR SELECTION

| | COLOR | MONOCHROME | any |
|---|---|---|---|
| CASSETTE 1  A4 | COLOR | MONOCHROME | any |
| CASSETTE 2  A3 | COLOR | MONOCHROME | any |
| CASSETTE 3  B5 | COLOR | MONOCHROME | any |
| CASSETTE 4  B4 | COLOR | MONOCHROME | any |

605, 606

607 — OK

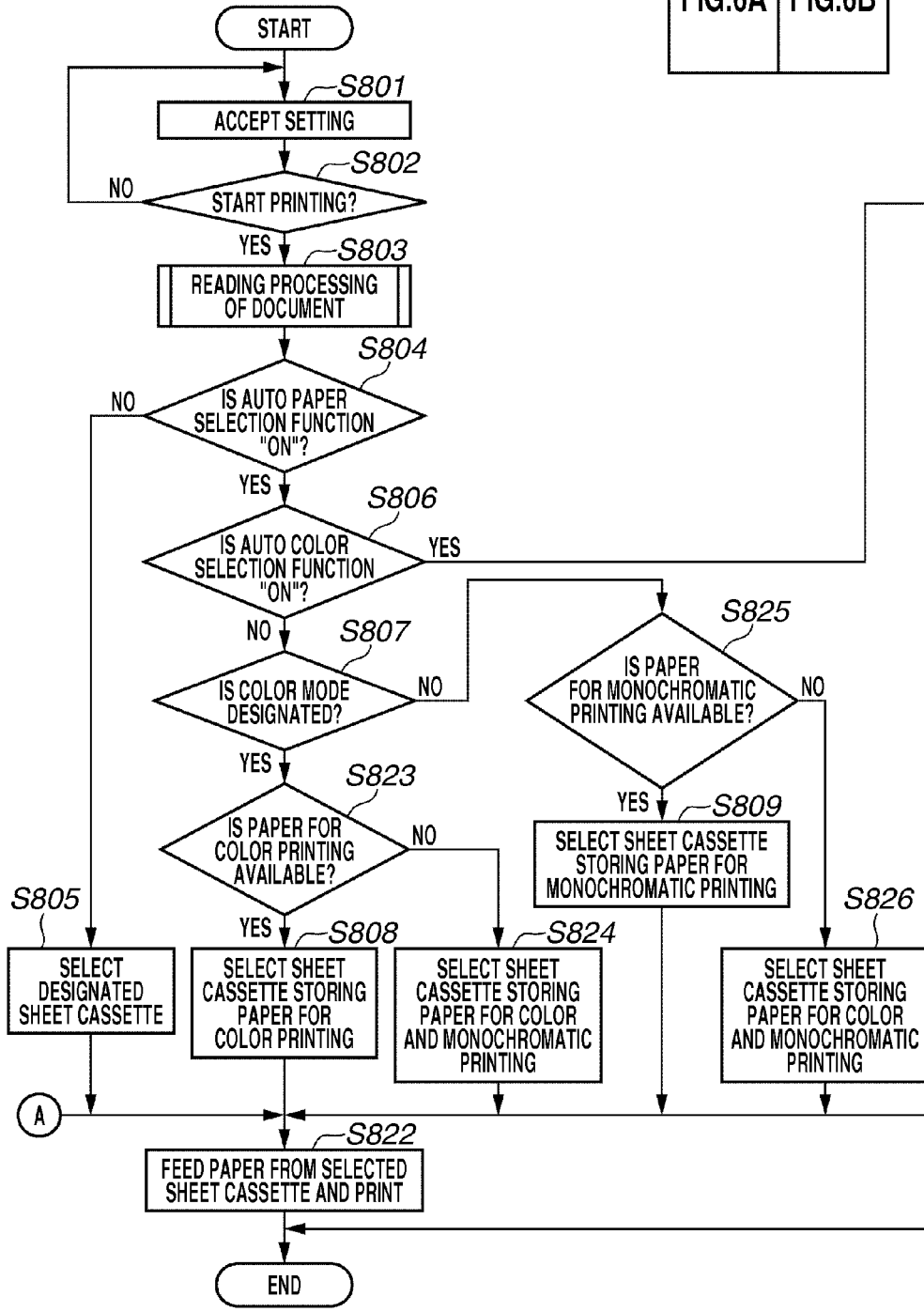

FIG.9A

| NUMBER OF PAGES | SIZE | COLOR/ MONOCHROME |
|---|---|---|
| FIRST PAGE | A4 | COLOR |
| SECOND PAGE | A4 | COLOR |
| THIRD PAGE | A4 | COLOR |
| FOURTH PAGE | A4 | COLOR |
| FIFTH PAGE | A4 | MONOCHROME |
| SIXTH PAGE | A4 | MONOCHROME |

FIG.9B

| SHEET CASSETTE | SIZE | COLOR TYPE | INTENDED FOR AUTO PAPER SELECTION |
|---|---|---|---|
| SHEET CASSETTE 1 | A4 | COLOR | ON |
| SHEET CASSETTE 2 | A3 | COLOR | ON |
| SHEET CASSETTE 3 | B5 | MONOCHROME | ON |
| SHEET CASSETTE 4 | B4 | MONOCHROME | OFF |

IMAGE FORMING APPARATUS, CONTROL METHOD OF IMAGE FORMING APPARATUS, AND STORAGE MEDIUM

BACKGROUND OF THE INVENTION

1. Field of the Invention

The present invention relates to an image forming apparatus, a control method of the image forming apparatus, and a storage medium.

2. Description of the Related Art

Conventionally, as discussed in Japanese Patent Application Laid-Open No. 11-003001, there are image forming apparatuses that determine, out of images of a plurality of pages to be printed, print an image of a color page on a sheet for color printing and an image of a monochromatic page on a sheet for monochromatic printing (e.g., plain paper). When such image forming apparatuses are used, enhanced image quality can be obtained since a color image is printed on a sheet for color printing. Further, the sheet cost can be saved since a monochromatic image is printed on a sheet for monochromatic printing.

However, if a print job of documents including both a color page and a monochromatic page is executed, since the printed output includes a sheet for color printing as well as a sheet for monochromatic printing, the printed output as a whole includes sheets of a different color and material.

When a user prepares printed output for a specified purpose (e.g., paper handed out to customers or reference materials distributed at meetings), the user may not desire to have a sheet for color printing and a sheet for monochromatic printing in a mixed manner. However, if the conventional image forming apparatus is used, the user is unable to know that the printed output may include a sheet for color printing as well as a sheet for monochromatic printing before the job is executed. Thus, when the user knows that different types of sheets are mixed in the printed output after the execution of the print job, the user designates the storage unit that stores the sheets to be used and executes the job again if the user does not desire to have different types of sheets in a mixed manner. Accordingly, the sheets will be wasted.

SUMMARY OF THE INVENTION

According to an aspect of the present invention, an image forming apparatus for conveying a sheet from any of a plurality of storage units and forming an image on the conveyed sheet includes an executing unit configured to execute a job for forming an image on each of a plurality of sheets, a determining unit configured to determine for each page whether the image formed on the plurality of sheets by the job executing unit is a color image or a monochromatic image, a conveyance control unit configured to convey a sheet from a storage unit storing a sheet for color printing out of the plurality of storage units to form an image of a page determined as the color image by the determining unit and convey a sheet from a storage unit storing a sheet for monochromatic printing out of the plurality of storage units to form an image of a page determined as the monochromatic image by the determining unit, and a notifying unit configured to, if there is a possibility that a sheet is conveyed from both the storage unit storing the sheet for color printing and the storage unit storing the paper for monochromatic printing by the conveyance control unit when the executing unit executes the job, notify a user of the possibility before the job is executed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 illustrates an operation unit of the image forming apparatus according to the exemplary embodiment.

FIGS. 5A, 5B, and 5C illustrate operation screens according to the exemplary embodiment.

FIGS. 6A and 6B show a flowchart illustrating a control example of the image forming apparatus according to the exemplary embodiment.

FIG. 6 illustrates the combination of FIG. 6A and FIG. 6*b*.

FIGS. 9A and 9B are tables used for describing the exemplary embodiment.

DESCRIPTION OF THE EMBODIMENTS

Various exemplary embodiments, features, and aspects of the invention will be described in detail below with reference to the drawings.

Figure 1:
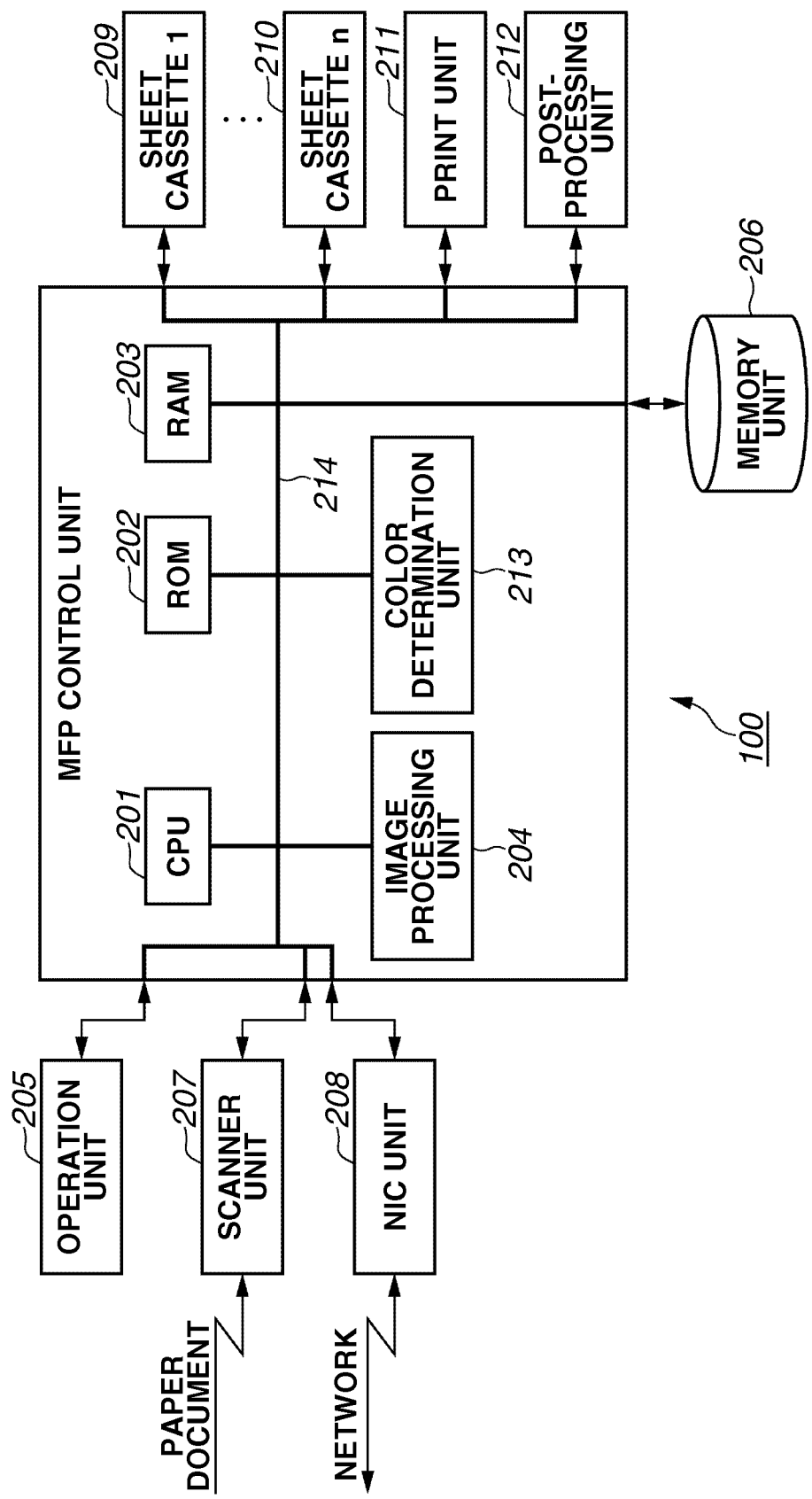
FIG. 1 is a block diagram illustrating a configuration of an image forming apparatus according to an exemplary embodiment of the present invention.

FIG. 1 is a block diagram illustrating a configuration of an image forming apparatus according to an exemplary embodiment of the present invention. According to the present embodiment, a multi functional peripheral (MFP) having a plurality of functions including a scanner function and a printing function will be described as an example of the image forming apparatus.

A MFP 100 includes a MFP control unit which includes a central processing unit (CPU) 201, a read-only memory (ROM) 202, a random access memory (RAM) 203, an image processing unit 204, and a color determination unit 213. Further, the MFP 100 includes an operation unit 205, a memory unit 206, a scanner unit 207, a network interface card (NIC) unit 208, sheet cassettes (a sheet cassette 1 (209) to a sheet cassette n (210)), a print unit 211, and a post-processing unit 212. Since these units are connected to a bus 214, various data can be exchanged between the units.

The CPU 201 is a control unit that performs overall control of the MFP 100. The ROM 202 stores various programs executed by the CPU 201. The RAM 203 functions as a work memory of the CPU 201. The CPU 201 performs various control operations by loading a program stored in the ROM 202 into the RAM 203 and executing the program. According to the control of the CPU 201, for example, the scanner unit 207 reads a document and the print unit 211 prints the document.

When an instruction is sent from the CPU 201 to the image processing unit 204, the image processing unit 204 processes print data such as page description language (PDL) data and generates image data. The scanner unit 207 reads a document mounted on a document positioning plate and generates image data using the image of the document which has been read. The generated image data is transferred to the CPU 201. Further, the scanner unit 207 includes an automatic document feeder (ADF) which conveys one document at a time out of a plurality of documents mounted thereon. The scanner unit 207 can also read the image of the document fed by the ADF.

The NIC unit 208 is connected to a network and transmits print data sent from an external personal computer (PC) or a server to the MFP control unit. Further, on receiving an instruction from the CPU 201, the NIC unit 208 transmits image data stored in the memory unit 206 and status information of the MFP 100 to the external PC or the server.

The color determination unit 213 determines whether an image of a document read by the scanner unit 207 is a color or a monochromatic image according to an instruction sent from the CPU 201. The color determination unit 213 performs this processing for each page of the document and transmits the result of the determination to the CPU 201. The CPU 201 manages the document depending on whether each page of the document is a color or a monochromatic image according to the result of the determination performed by the color determination unit 213 and stores the information in the memory unit 206. For example, if six sheets are read, the CPU 201 stores, in the memory unit 206, information of each size of the sheets and whether each image is a color or a monochromatic image, and manages the information as illustrated in FIG. 9A. The color determination unit 213 determines whether the image is a color image according to whether a color pixel is included in the image. If a color pixel is included, the color determination unit 213 determines that the image of the document is a color image. On the other hand, if a color pixel is not included, the color determination unit 213 determines that the image of the document is a monochromatic image.

The color determination unit 213 can also perform the color determination of print data sent from an external PC and received via the NIC unit 208. The received print data is processed by the image processing unit 204. Then, the color determination unit 213 determines whether the image is a color image for each page of the processed image data. The result of the determination is subsequently transmitted to the CPU 201. The CPU 201 stores the result of the determination in the memory unit 206 and manages the image data depending on whether the image of the image data is a color or a monochromatic image for each page.

In the description above, an image of image data processed from the print data is checked whether it is a color image or a monochromatic image for each page of the document. However, the present invention is not limited to such an example. For example, whether an image of each page of the print data is a color image or a monochromatic image can be determined according to data of an attribute of each page included in the print data. Further, if print data including images of six pages is received, the CPU 201 analyzes the print data, stores the result in the memory unit 206, and manages information, such as the one illustrated in FIG. 9A, according to the result of the analysis.

The operation unit 205 includes a touch panel and a hard key and accepts operations performed by the user. Further, the operation unit 205 includes a display unit. The display unit displays the state of the MFP 100 and also displays an error message when an error occurs. The memory unit 206 is, for example, a hard disk drive (HDD) or a Secure Digital (SD) card. Print data and image data processed by the image processing unit 204 is stored in the memory unit 206.

Each of the sheet cassettes 1 (209) to n (210) stores a plurality of sheets for printing. For example, the sheet cassette stores, for example, paper suitable for color printing (also referred to as color paper or a sheet for color printing) and paper suitable for monochromatic printing (also referred to as monochromatic print paper or a sheet for monochromatic printing). According to the present embodiment, although the number n of the sheet cassettes is described as four, any number of cassettes equal to or greater than two can be used. Further, a feeding deck or a manual feed tray can be used in place of the sheet cassette. Furthermore, a unit which functions as a sheet storage unit which stores paper (or simply referred to as a storage unit) can be used in place of the sheet cassette.

As illustrated in FIG. 9B, the CPU 201 stores, in the memory unit 206, attribute information of the paper (also referred to as a sheet or a recording medium) stored in the sheet cassettes 1 (209) to n (210) for each sheet cassette and manages the attribute information. The attribute information of the paper is, for example, the size and the type of the paper. The information of the type of the paper is, for example, whether the paper is paper for color printing or paper for monochromatic printing.

If the user stores A4-size paper for color printing in one of the sheet cassettes, the user also inputs information that A4-size paper for color printing is stored in the sheet cassette using the operation unit 205. Further, if the user stores A4-size paper for monochromatic printing in one of the sheet cassettes, the user also inputs information that A4-size paper for monochromatic printing is stored in the sheet cassette using the operation unit 205. The CPU 201 stores, in the memory unit 206, attribute information of the paper set by the user in association with the sheet cassette. Then, the CPU 201 performs feeding control (conveyance control) of the paper according to the attribute information stored in the memory unit 206.

The print unit 211 includes a micro processing unit (MPU). When the print unit 211 receives a print command and image data from the MFP control unit, an image is printed on the paper fed from one of the sheet cassettes 1 (209) to n (210) by the MPU. The post-processing unit 212 executes post processing with respect to the paper having an image printed by the print unit 211. The post processing is, for example, stapling, punching, and sorting.

Figure 2:
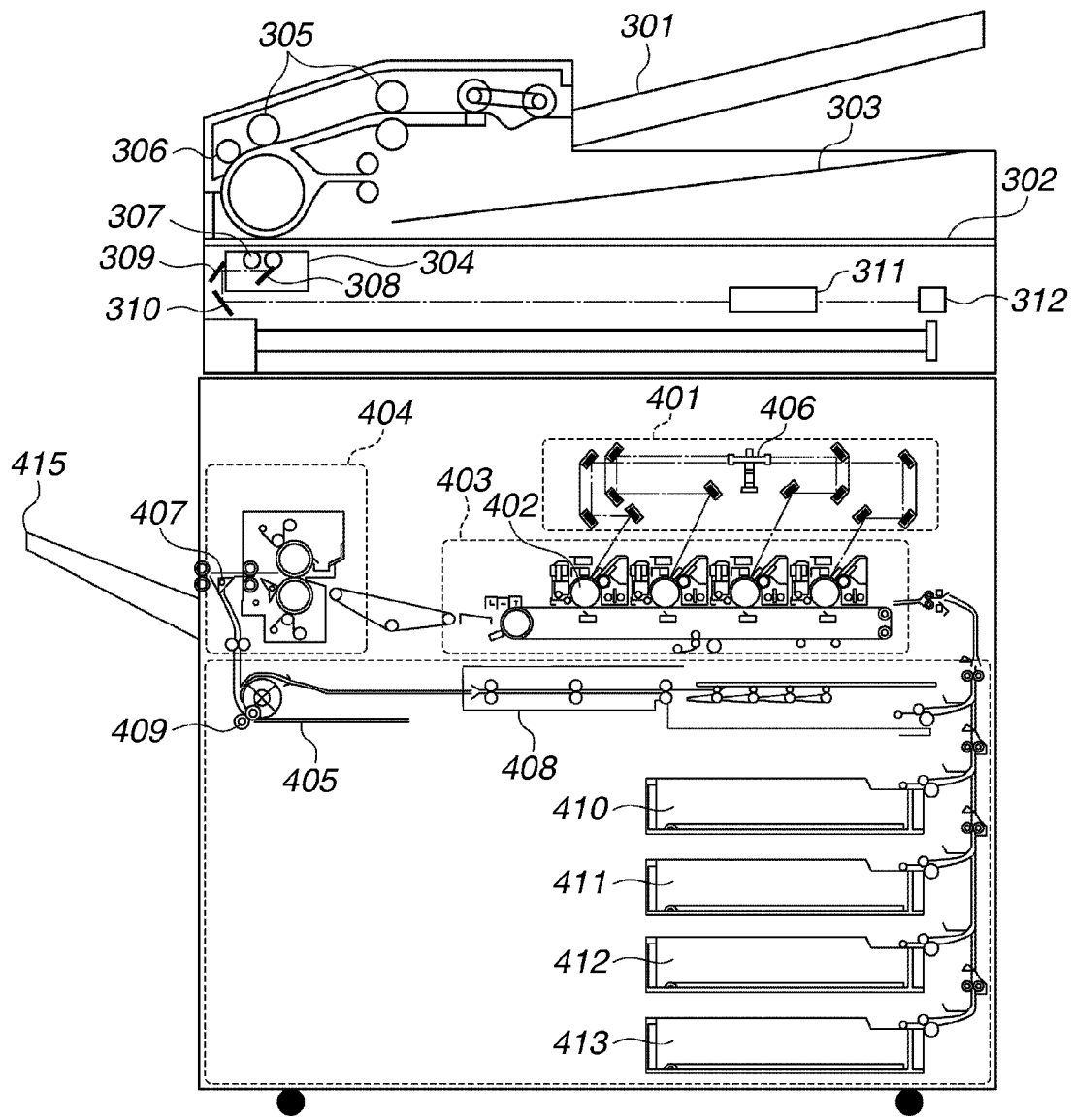
FIG. 2 is a cross sectional drawing of the image forming apparatus according to the exemplary embodiment.

FIG. 2 is a cross-sectional drawing illustrating a configuration of the MFP 100. The MFP 100 includes a scanning unit and a printer unit.

The scanning unit is where the sheets loaded on an automatic document feeder (ADF) 301 are sequentially conveyed to a document scanning position one sheet at a time in the order they are loaded. Then, each sheet is scanned at the document scanning position and discharged on a discharge tray 303. On the conveyance path through which the sheets are conveyed, there are provided a conveyance roller 305 driven by a stepping motor and a document detection sensor 306 which detects the leading and the trailing edges of the sheets.

Each sheet loaded on the ADF 301 is conveyed by the conveyance roller 305 driven by a stepping motor and passes the document scanning position at a fixed speed. When the sheet passes the document scanning position, an optical unit 307 moves to the document scanning position and irradiates the sheet which is being conveyed. The light reflected from the document is guided to a charge-coupled device (CCD)

image sensor (hereinafter referred to as a "CCD") 312 including a color separation filter via a plurality of mirrors 308, 309, and 310 and a lens 311. In this manner, an image of the scanned sheet is subjected to the color separation processing and is read by the CCD 312. The image data for each color (R, G, and B) is read and generated by the CCD 312, and the generated image data is transferred to the MFP control unit.

The printer unit includes four developing units used for forming images by cyan (C), magenta (M), yellow (Y), and black (K) toner and forms a color image or a monochromatic image. The printer unit includes a laser exposure unit 401, a polygonal mirror 406, a photosensitive drum 402, an imaging unit 403, a fixing unit 404, a flapper 407, a reverse path 405, a roller 409, and a two-sided conveying path 408. Further, the printer unit includes sheet cassettes 410 to 413.

The laser exposure unit 401 directs a light beam such as a laser beam which has been modulated according to the image data onto the polygonal mirror 406 which rotates at a constant angular velocity. Then, a light beam reflected from the polygonal mirror hits the photosensitive drum 103 as a scanning light.

The image forming unit 403 is configured to form an image by a series of electrophotographic processes including rotating the photosensitive drum 402, applying an electric charge to a charging unit, developing a latent image formed on the photosensitive drum 402 by the laser exposure unit 401 with toner, and transferring the toner image to a sheet. The image forming unit 403 also recovers a minute amount of toner that remains untransferred on the photosensitive drum 402. Image formation is realized by four developing units (developing stations) of the above-described series of electrophotographic processes. The four developing units are arranged in the order of cyan (C), magenta (M), yellow (Y), and black (K). Magenta, yellow, and black image forming operations by the corresponding developing units are sequentially executed after a predetermined time from the start of the image formation of the cyan developing unit. With this timing control, a full-color image without color misregistration is transferred onto the sheet.

The fixing unit 404 includes a combination of rollers and belts and a heat source such as a halogen heater. The fixing unit 404 applies heat and pressure to fix the toner which is transferred to the sheet by the imaging unit 403.

Each of the sheet cassettes 410 to 413 stores sheets. When a sheet is fed from one of the sheet cassettes 410 to 413, it is conveyed to the imaging unit 403 by a conveying belt. Then, the image formed by the imaging unit 403 is transferred onto the sheet which has been conveyed. The transferred image is fixed to the sheet by the fixing unit 404.

If the sheet is to be discharged with the image-formed side facing down (i.e., face-down discharge), the sheet is guided to the reverse path 405 by the flapper 407. Accordingly, the reversed sheet is discharged on a discharge tray 415. On the other hand, if the sheet is to be discharged with the image-formed side facing up (i.e., face-up discharge), the sheet is discharged on the discharge tray 415 without being guided to the reverse path 405 by the flapper 407.

Further, if two-sided printing is to be performed, the sheet is guided to the reverse path 405 by the flapper 407, and the trailing edge of the sheet is pinched by the roller 409. Then, the sheet is guided to the two-sided conveying path 408. Subsequently, the sheet on the two-sided conveying path 408 is conveyed again to the imaging unit 403. Then, an image is printed on the back side of the sheet by the imaging unit 403. The sheet having the image printed on the back side is discharged on the discharge tray 415.

In this manner, the MFP 100 prints a color image on a sheet. When printing a monochromatic image on a sheet, only the developing unit for black color of the imaging unit 403 is driven. Then, the image is printed on the sheet fed from one of the sheet cassettes 410 to 413 using black toner.

Next, the operation unit 205 included in the MFP 100 illustrated in FIG. 2 will be described with reference to FIG. 3.

The operation unit 205 includes a key input unit 901 and a touch panel unit 902 which can display a softkey (display key). The user operates a hardkey using the key input unit 901 and operates a softkey using the touch panel unit 902.

First, the key input unit 901 will be described. As illustrated in FIG. 3, the key input unit 901 includes an ON/OFF switch 903. If the user presses the ON/OFF switch 903 when the MFP 100 is in the standby mode (normal operating state), the CPU 201 changes the mode of the MFP 100 from the standby mode to the sleep mode (power-saving state). On the other hand, if the user presses the ON/OFF switch 903 when the MFP 100 is in the sleep mode, the CPU 201 changes the mode of the MFP 100 from the sleep mode to the standby mode.

A start key 905 is used for instructing the MFP 100 to execute an operation such as a copy operation or a data transmission operation. A stop key 904 is used for stopping a copy operation or a data transmission operation. A numeric keypad 906 is used for inputting various numeric values.

Next, the touch panel unit 902 will be described. The touch panel unit 902 includes a liquid crystal display (LCD) unit and a touch panel sheet. The touch panel sheet includes a transparent electrode and is attached to the LCD unit. The touch panel unit 902 accepts various settings set by the user and also provides information to the user.

The MFP 100 having the above-described configuration is also provided with an auto color selection (ACS) function. The ACS function is used for determining whether an image of a document read by the scanner unit 207 is a color or a monochromatic image. This determination is performed by the color determination unit 213. When an image of one page is generated, the color determination unit 213 determines whether the image is a color or a monochromatic image.

Next, the CPU 201 prints a color image using the developing units of cyan (C), magenta (M), yellow (Y), and black (K) if the image of the document read by the scanner unit 207 is a color image. On the other hand, the MFP 100 prints a monochromatic image using the developing unit of black (K) if the image of the document is a monochromatic image. If a plurality of documents fed by the ADF 301 are read by the scanner unit 207, whether the image of each document is a color or a monochromatic image is sequentially determined by the color determination unit 213. Then, the CPU 201 stores the result of the determination in the memory unit 206 and manages it as illustrated in FIG. 9A. Further, the CPU 201 stores the information of the size of the image of each document in the memory unit 206 for each page and manages the information.

Further, each of the sheet cassettes 410 to 413 included in the MFP 100 stores paper for color printing or monochromatic printing. According to the setting set by the user and accepted via the operation unit 205, the CPU 201 manages information of the paper size and the paper type (e.g., paper for color printing or for monochromatic printing) for each sheet cassette in the memory unit 206 as illustrated in FIG. 9B.

When printing an image of a page which has been determined by the auto color selection function as a color image, the CPU 201 specifies a sheet cassette which stores paper for color printing according to the information illustrated in FIG.

9B. Then, the CPU 201 feeds paper from the specified sheet cassette and prints a color image on the paper for color printing which has been fed. On the other hand, when printing an image of a page which has been determined by the auto color selection function as a monochromatic image, the CPU 201 specifies a sheet cassette which stores paper for monochromatic printing according to the information illustrated in FIG. 9B. Then, the CPU 201 feeds paper from the specified sheet cassette and prints a monochromatic image on the paper for monochromatic printing which has been fed.

In this manner, the CPU 201 selects the sheet cassette according to whether the image to be printed is a color or a monochromatic image and feeds the paper from the sheet cassette by using the auto color selection function and the auto paper selection function.

According to these functions, the CPU 201 can print an image of a color page on the paper for color printing and an image of a monochromatic page on the paper for monochromatic printing out of the images of the plurality of documents.

Next, detailed control of the CPU 201 that realizes the above-described functions will be described.

Figure 4A:
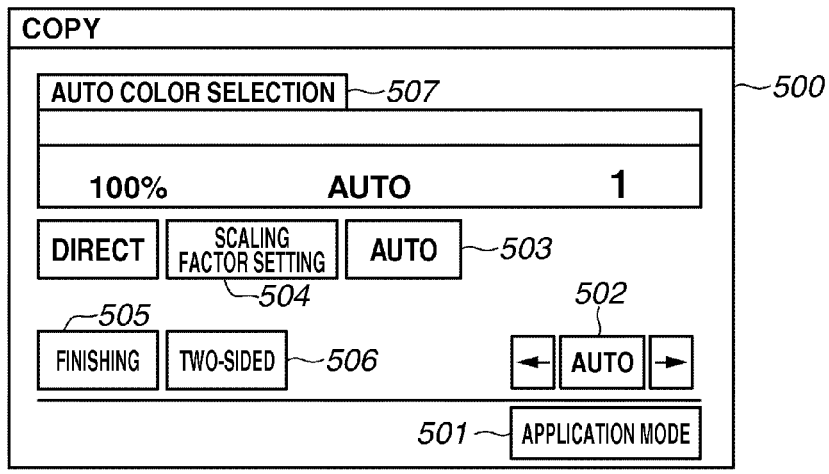
FIGS. 4A, 4B, and 4C illustrate operation screens according to the exemplary embodiment.
Figure 4B:
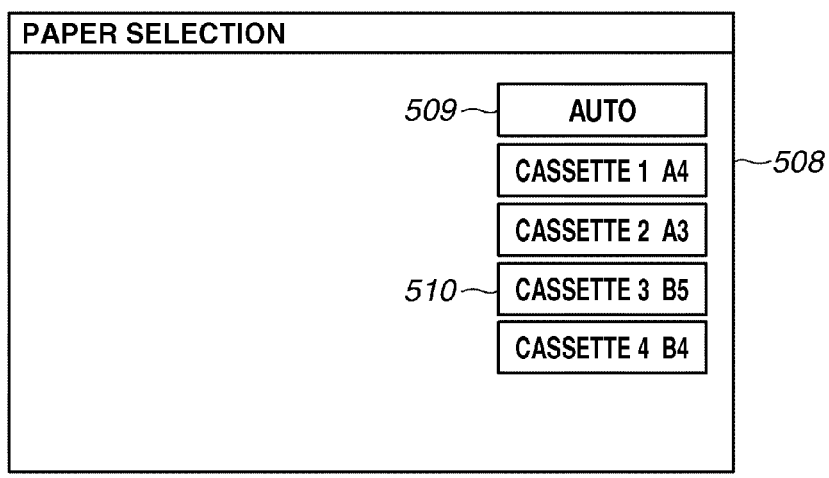
Figure 4C:
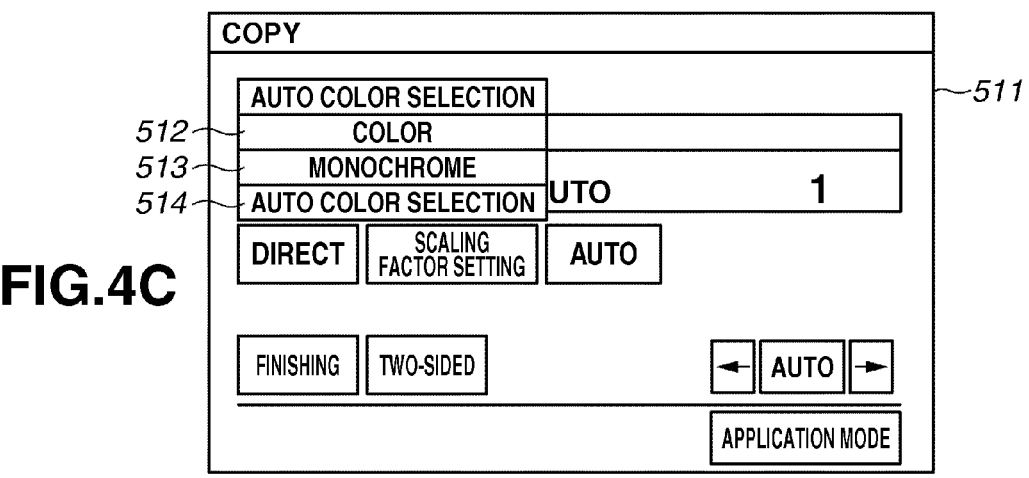

FIGS. 4A to 4C illustrate examples of a screen displayed on the touch panel unit 902. An initial screen 500 illustrated in FIG. 4A is displayed on the touch panel unit 902 when the MFP 100 is started.

The initial screen 500 includes an application mode key 501, a density adjustment key 502, a paper selection key 503, a scaling factor setting key 504, a finishing key 505, a two-sided printing setting key 506, and a color mode setting key 507. The user can set the job settings by selecting these keys.

The application mode key 501 is used for setting functions such as the reduced layout function and the preview function. When the user selects the reduced layout function, images of a plurality of documents are arranged on one sheet of paper and printed. When the user selects the preview function, an image of a document which has been read is displayed on the touch panel unit 902 before it is printed. The density adjustment key 502 is used when the user adjusts the print density.

The paper selection key 503 is used for displaying a paper selection screen 508 illustrated in FIG. 4B. The paper selection screen 508 is used when the user designates the sheet cassette which feeds the paper for printing. An auto paper selection key 509 is a key for enabling the auto paper selection function. When the user selects the auto paper selection key 509, the CPU 201 selects the sheet cassette used for the printing according to the size of the image of the document and whether the image is a color or a monochromatic image.

A sheet cassette selection key 510 is used when a sheet cassette is directly selected by the user from the sheet cassettes 410 to 413 and not by the CPU 201. According to the screen illustrated in FIG. 4B, cassettes 1, 2, 3, and 4 correspond to the sheet cassettes 410, 411, 412, and 413, respectively.

The scaling factor setting key 504 is used for setting a scaling factor of the printing. The finishing key 505 is used for setting post processing. For example, via a screen which is displayed when the user selects the finishing key 505, the user can set the shift sort function. When this function is used, each image-printed sheet stack is discharged onto the discharge tray. The two-sided printing setting key 506 is used for setting two-sided printing.

The color mode setting key 507 is used for selecting the determination method of whether an image of a document is a color or a monochromatic image. If the user selects the color mode setting key 507, a pull-down menu is displayed on the screen (see screen 511 in FIG. 4C). If the user selects a "color" key 512 from the pull-down menu, the CPU 201 determines that all the images of the documents which have been read are color images regardless of the result of the determination performed by the color determination unit 213. Further, if the user selects a "monochrome" key 513, the CPU 201 determines that all the images of the documents which have been read are monochromatic images regardless of the result of the determination performed by the color determination unit 213. Furthermore, if the user selects an "auto color selection" key 514, the CPU 201 determines whether the images of the documents which have been read are color or monochromatic images for each page according to the result of the determination performed by the color determination unit 213. The CPU 201 stores the result of the determination in the memory unit 206 as illustrated in FIG. 9B and manages the information.

Next, the items to be set for the MFP 100 before using the auto paper selection function will be described.

The user can set the paper size (e.g., A3, A4, A5, B4, B5) for each sheet cassette via the operation unit 205. The user can also set the type of paper stored in each sheet cassette (e.g., paper for color printing, paper for monochromatic printing) via the operation unit 205. Additionally, the user can set the sheet cassette used for the auto paper selection function via the operation unit 205. The CPU 201 accepts the above-described settings via the operation unit 205. A setting screen used for accepting the settings will be described below.

A screen 600 illustrated in FIG. 5A is displayed on the touch panel unit 902 when the user presses a user mode key illustrated in FIG. 3. The user can set various settings of the MFP 100 via the screen 600.

A "cassette auto selection ON/OFF" key in a key group 601 is used for displaying a screen 602 illustrated in FIG. 5B. The screen 602 displays the sheet cassettes of the MFP 100 and the size of the paper stored in each sheet cassette.

After the screen 602 is displayed, the user sets whether each sheet cassette is to be selected by the auto paper selection function (ON) or not to be selected by the auto paper selection (OFF). An OK button 604 is used for confirming the content set on the screen 602 as well as closing the screen 602 and displaying the screen 600 again. When the OK button 604 is selected, the CPU 201 sets the sheet cassette corresponding to "ON" as the cassette to be automatically selected by the auto paper selection function. On the other hand, the CPU 201 does not select the sheet cassette set to "OFF" as the cassette to be automatically selected by the auto paper selection function.

An "auto selection of cassette by color selection" key in the key group 601 is a key for displaying a screen 605 illustrated in FIG. 5C. The screen 605 displays a key group 606 used for selecting one key out of "color", "monochrome", and "any" keys. The "color" key is selected by the user when paper for color printing is stored in the sheet cassette. The "monochromatic" key is selected by the user when paper for monochromatic printing is stored in the sheet cassette. The "any" key is selected by the user when paper which can be used for both the color and the monochromatic printing is stored in the sheet cassette.

An OK button 607 is for confirming the content of the settings set on the screen 605. The OK button 607 is also used for closing the screen 605 and displaying the screen 600 again. If the user selects the OK button 607, the CPU 201 recognizes that the sheet cassette corresponding to "color" stores the paper for color printing and the sheet cassette corresponding to "monochrome" stores the paper for monochrome printing. Furthermore, the CPU 201 recognizes that the sheet cassette corresponding to "any" stores paper which can be used for both the color and the monochromatic printing. The information set via the screen is stored in the memory unit 206 by the CPU 201 as attribute information of each sheet cassette as illustrated in FIG. 9B.

After the above-described setting is set, if the user presses the start key 905, the CPU 201 executes the job according to the content of the setting.

Figure 6B:
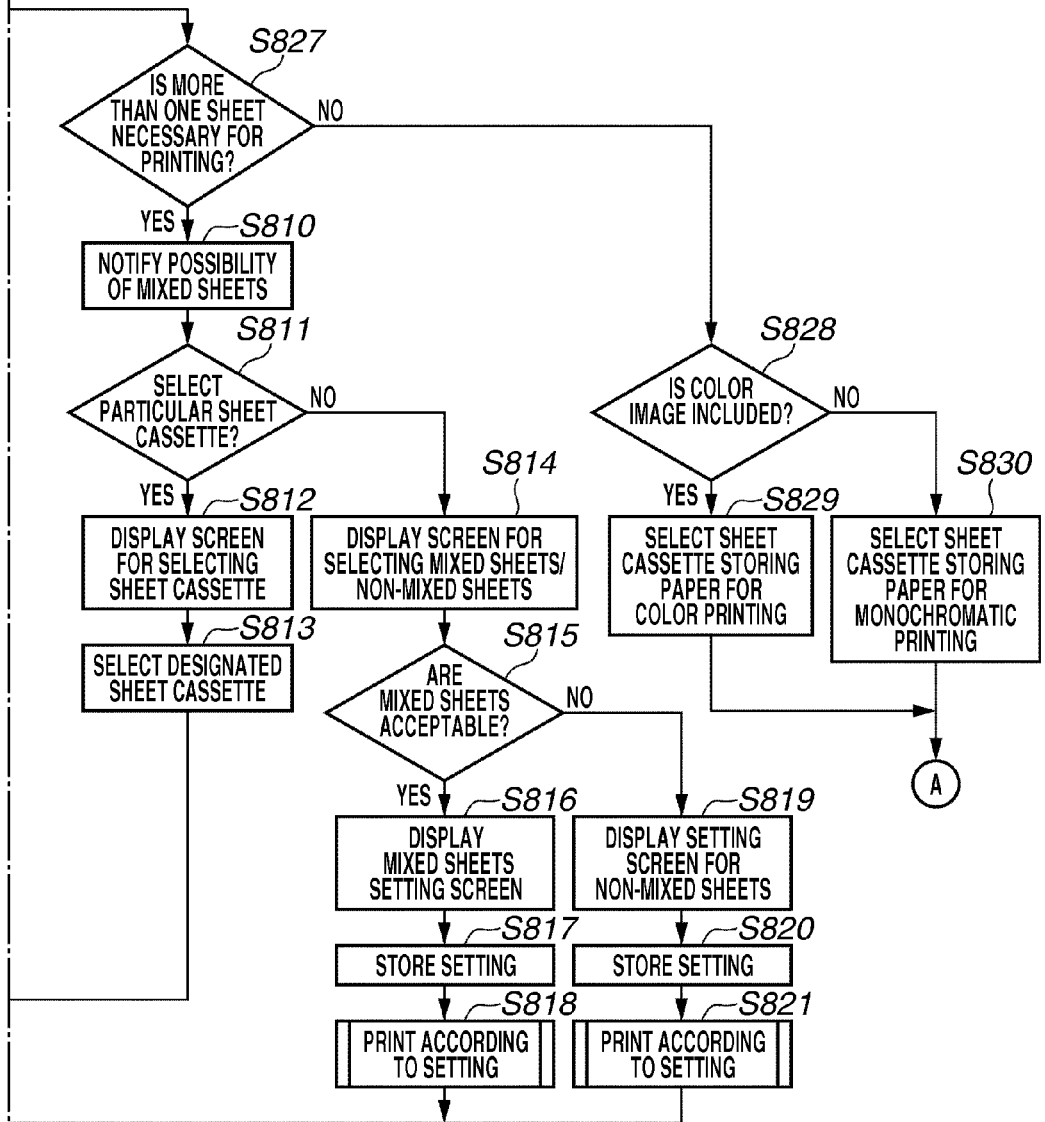

Next, processing from when the setting has been accepted via the above-described screen to when the image of the document is printed will be described with reference to FIG. 6. The processing of the flowchart in FIG. 6 is realized when the CPU 201 loads a program stored in the ROM 202 into the RAM 203 and executes the program.

In step S801, the CPU 201 accepts the setting set by the user via the screens described with reference to FIGS. 4A to 4C and FIGS. 5A to 5C, and stores the accepted setting in the memory unit 206. Since the setting set via the screens illustrated in FIGS. 5A to 5C is accepted according to the setting of the MFP 100, this setting can be set at different timing before the processing of the flowchart in FIG. 6 is started.

In step S802, the CPU 201 determines whether the start key 905 is selected. If the start key 905 is not yet selected (NO in step S802), the processing returns to step S801. If the start key is selected (YES in step S802), the processing proceeds to step S803.

Figure 10:
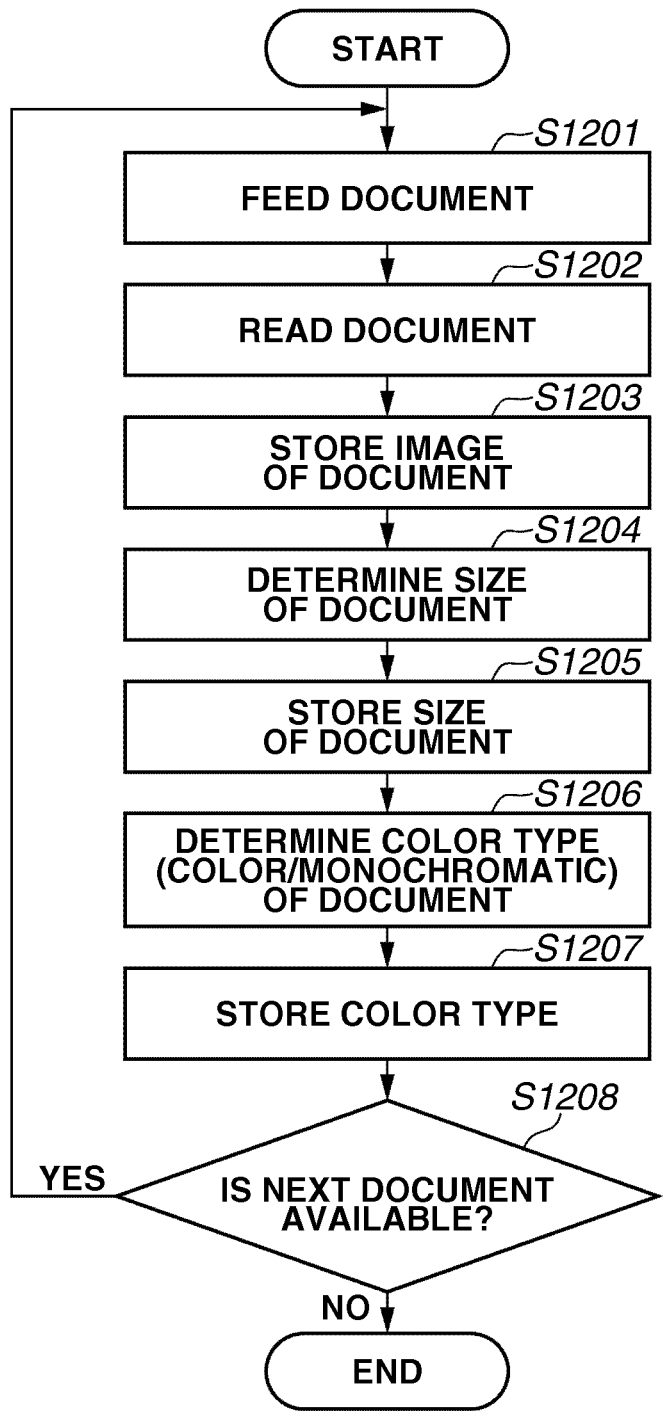
FIG. 10 is a flowchart illustrating a control example of the exemplary embodiment.

In step S803, the CPU 201 executes reading processing of the document mounted on the scanner unit 207. Details of the reading processing of the document will be described with reference to the flowchart in FIG. 10. The processing illustrated in the flowchart in FIG. 10 is executed by the CPU 201 loading a program stored in the ROM 202 into the RAM 203.

In step S1201, the CPU 201 instructs the scanner unit 207 to feed a document. On receiving the instruction, the scanner unit 207 feeds one sheet (document). In step S1202, the CPU 201 instructs the scanner unit 207 to read the image of the document which has been fed. In step S1203, the CPU 201 stores the image of the document which has been read in the memory unit 206. In step S1204, the CPU 201 determines the size of the image of the scanned document. In step S1205, the CPU 201 stores the size determined in step S1204 in the memory unit 206.

In step S1206, the CPU 201 determines whether the image of the document is a color or a monochromatic image. In step S1207, the CPU 201 stores the result of the determination in the memory unit 206. In step S1208, the CPU 201 determines whether the scanner unit 207 has a next document according to the determination performed by the document detection sensor 306 of the scanner unit 207. If the CPU 201 determines that the next document exists (YES in step S1208), the processing returns to step S1201. If the CPU 201 determines that the next document does not exist (NO in step S1208), the processing of the flowchart in FIG. 10 ends, and the processing proceeds to step S804 in FIG. 6.

In step S803 described above, the scanner unit 207 can continuously read a plurality of documents or read one document. If the scanner unit 207 reads a plurality of documents, the ADF 301 feeds the plurality of documents one sheet at a time and the scanner unit 207 reads the conveyed sheets. If the scanner unit 207 reads one document, the scanner unit 207 reads one document fed by the ADF 301 or one document set on the document positioning plate by the user.

Further, a plurality of documents can be printed without using the ADF if a mode called continuous reading mode is used. When this mode is used, images of a plurality of documents set by the user on the document positioning plate one sheet at a time are stored in the memory unit 206 and printed when the user gives an instruction.

When using the continuous reading mode, the user enables the continuous reading mode by selecting a continuous reading key (not illustrated) provided on the operation unit 205. Then, if the user presses the start key 905 in the continuous reading mode, the CPU 201 reads the document mounted on the document positioning plate and stores the acquired image in the memory unit 206 without printing it. Unless the user presses a reading termination key (not illustrated) provided on the operation unit 205, the CPU 201 reads the document mounted on the document positioning plate each time the start key 905 is pressed, and stores the acquired image in the memory unit 206 without printing it. When the user presses the reading termination key, the processing proceeds to step S804. In this case also, the CPU 201 determines the size of the image and whether the image is a color or a monochromatic image with respect to each page of the plurality of documents and stores the result of the determination in the memory unit 206.

In step S804, the CPU 201 references the content of the setting stored in the memory unit 206 in step S801 and determines whether the auto paper selection function is enabled by the auto paper selection key 509 in FIG. 4B. If the CPU 201 determines that the auto paper selection function is enabled (YES in step S804), the processing proceeds to step S806. On the other hand, if the CPU 201 determines that a particular sheet cassette is designated by the user by the sheet cassette selection key 510 (NO in step S804), the processing proceeds to step S805.

In step S805, the CPU 201 selects the sheet cassette designated by the user and stores, in the memory unit 206, the information of the selected sheet cassette as the information of the sheet cassette to be used for the printing. Then, the processing proceeds to step S822. In step S822, the CPU 201 instructs the print unit 211 to print the image of the document read and stored in the memory unit 206 in step S803 on the paper fed from the sheet cassette which has been selected according to the designation of the user. The print unit 211 prints the image on the paper fed from the sheet cassette according to the instruction, and then the processing ends.

If the document has a plurality of pages, the CPU 201 instructs the print unit 211 to print the images of the plurality of pages on the paper fed from the selected sheet cassette. The print unit 211 prints the images on the paper fed from the selected sheet cassette according to the instruction, and then the processing ends.

If the auto paper selection function is enabled, the processing proceeds to step S806. In step S806, the CPU 201 references the content of the setting stored in the memory unit 206 in step S801 and determines whether the auto color selection function is enabled. If the color mode setting key 507 is selected in step S801, the auto color selection function is determined as enabled. If the auto color selection function is determined as enabled (YES in step S806), the processing proceeds to step S827. On the other hand, if the auto color selection function is disabled, in other words, if the color key 512 or the monochrome key 513 is selected on the screen illustrated in FIG. 4C (NO in step S806), the processing proceeds to step S807.

In step S807, the CPU 201 determines whether the color key 512 is selected. If the color key 512 is selected (YES in step S807), the processing proceeds to step S823.

In step S823, the CPU 201 determines whether any of the sheet cassettes 410 to 413 of the MFP 100 is set to "color" on the screen 605 in FIG. 5C. If such a sheet cassette exists (YES in step S823), the CPU 201 determines that a sheet cassette that stores paper for color printing exists, and the processing proceeds to step S808. On the other hand, if a sheet cassette set to "color" does not exist on the screen 605 (NO in step S823), the CPU 201 determines that a sheet cassette that stores paper for color printing does not exist, and the processing proceeds to step S824.

In step S808, the CPU 201 determines the sheet cassette set to "color" on the screen 605 in FIG. 5C. If "color" is set for a plurality of sheet cassettes, the CPU 210 selects, from the specified sheet cassettes, a sheet cassette that stores paper for color printing that matches the size of the image of the document, and stores, in the memory unit 206, the information of the selected sheet cassette as the information of the sheet cassette to be used for the printing. If a plurality of sheets having different sizes is read, the CPU 201 selects a plurality of sheet cassettes which stores paper for color printing with a corresponding paper size. Then, the CPU 201 stores, in the memory unit 206, the information of the selected sheet cassettes as the information of the sheet cassettes to be used for the printing.

In step S822, the CPU 201 instructs the print unit 211 to print the image of the document read in step S803 on the paper for color printing fed from the selected sheet cassette. According to the instruction, the print unit 211 prints the image on the paper for color printing fed from the sheet cassette selected by the CPU 201, and then the processing ends.

In step S824, the CPU 201 determines the sheet cassettes which are set to "any" on the screen 605 in FIG. 5C. Then, from the sheet cassettes which have been determined, the CPU 201 selects a sheet cassette which stores the paper which can be used for both the color and the monochromatic printing and of a size that matches the size of the image of the document, and stores the information of the selected sheet cassette in the memory unit 206 as the information of the sheet cassette to be used for the printing. If a plurality of documents having different image sizes is read, the CPU 201 selects a plurality of sheet cassettes which stores the paper which can be used for both the color and the monochromatic printing and corresponds to the sizes of the images. Then, the CPU 201 stores, in the memory unit 206, the information of the plurality of sheet cassettes as the information of the sheet cassettes to be used for the printing.

In step S822, the CPU 201 instructs the print unit 211 to print the image of the document read in step S803 on the paper which can be used for both the color and the monochromatic printing fed from the selected sheet cassette. According to the instruction, the print unit 211 prints the image on the paper which can be used for both the color and the monochromatic printing fed from the selected sheet cassette selected by the CPU 201, and then the processing ends.

In step S807, if the monochrome key 513 is selected via the screen 605 in FIG. 5C (NO in step S807), the processing proceeds to step S825. In step S825, the CPU 201 determines whether any of the sheet cassettes 410 to 413 of the MFP 100 is set to "monochromatic" on the screen 605 in FIG. 5C. If such a sheet cassette exists (YES in step S825), the CPU 201 determines that a sheet cassette that stores paper for monochromatic printing exists, and the processing proceeds to step S809. On the other hand, if a sheet cassette set to "monochromatic" does not exist on the screen 605 (NO in step S825), the CPU 201 determines that a sheet cassette that stores paper for monochromatic printing does not exist, and the processing proceeds to step S826.

In step S809, the CPU 201 determines the sheet cassette set to "monochromatic" on the screen 605 in FIG. 5C. If "monochromatic" is set for a plurality of sheet cassettes, the CPU 210 selects, from the determined sheet cassettes, a sheet cassette that stores paper for monochromatic printing that matches the size of the image of the document, and stores, in the memory unit 206, the information of the selected sheet cassette as the information of the sheet cassette to be used for the printing. If a plurality of sheets having different sizes is read, the CPU 201 selects a plurality of sheet cassettes which stores paper for monochromatic printing with a corresponding paper size.

In step S822, the CPU 201 instructs the print unit 211 to print the image of the document read and stored in the memory unit 206 in step S803 on the paper for monochromatic printing fed from the selected sheet cassette. According to the instruction, the print unit 211 prints the image on the paper for monochromatic printing fed from the sheet cassette selected by the CPU 201, and then the processing ends.

When the CPU 201 determines that a sheet cassette that stores paper for monochromatic printing does not exist, the processing proceeds to step S826. In step S826, the CPU 201 determines the sheet cassettes which are set to "any" on the screen 605 in FIG. 5C. Then, from the sheet cassettes which have been determined, the CPU 201 selects a sheet cassette which stores the paper which can be used for both the color and the monochromatic printing and of a size that matches the size of the image of the document, and stores the information of the selected sheet cassette in the memory unit 206 as the information of the sheet cassette to be used for the printing. If a plurality of documents having different image sizes is read, the CPU 201 selects a plurality of sheet cassettes which stores the paper which can be used for both the color and the monochromatic printing and corresponds to the sizes of the images. Then, the CPU 201 stores, in the memory unit 206, the information of the plurality of sheet cassettes as the information of the sheet cassettes to be used for the printing.

In step S822, the CPU 201 instructs the print unit 211 to print the image of the document read in step S803 on the paper which can be used for both the color and the monochromatic printing and is fed from the selected sheet cassette. According to the instruction, the print unit 211 prints the image on the paper which can be used for both the color and the monochromatic printing fed from the selected sheet cassette selected by the CPU 201, and then the processing ends.

In this manner, according to the processing on and after step S807 which does not use the auto color selection function, if paper for color printing is stored in any of the sheet cassettes 410 to 413 when "color" is selected, the paper for color printing is used even if paper which can be used for both the color and the monochromatic printing exists. Further, if paper for monochromatic printing is stored in any of the sheet cassettes 410 to 413 when "monochromatic" is selected, the paper for monochromatic printing is used even if paper which can be used for both the color and the monochromatic printing exists. The user can set either the paper for color printing or the paper for monochromatic printing as the paper which can be used for both the color and the monochromatic printing.

According to the above-described configuration, if a sheet cassette that stores paper for color printing does not exist when "color" is selected or if a sheet cassette that stores paper for monochromatic printing does not exist when "monochromatic" is selected, printing is performed using the paper which can be used for both the color and the monochromatic printing. However, before starting the printing using the paper which can be used for both the color and the monochromatic printing, a message notifying the user that there is no paper for color printing may be displayed for the user.

On the other hand, when the auto color selection function is enabled, the processing proceeds from step 806 to step S827. In step S827, before printing the image of the document read and stored in the memory unit 206 in step S803, the CPU 201 determines whether a plurality of sheets is necessary for the printing according to the number of documents which have been read and the print setting. If the number of documents which have been read is one, the CPU 201 determines that the number of sheets necessary for the printing is one. Further, even if the number of documents which have been read is two, if 2-in-1 printing, which is printing of document images of two pages on one sheet of paper, is set, the CPU 201 determines that the number of sheets necessary for the printing is one. On the other hand, if a plurality of documents is read and if the number of sheets necessary for the printing is more than one according to the print setting, the CPU 201 determines that a plurality of sheets is necessary for the printing.

In this manner, if the CPU 201 determines that a plurality of sheets is necessary for the printing (YES in step S827), the processing proceeds to step S810. If the CPU 201 determines that one sheet is necessary for the printing (NO in step S827), the processing proceeds to step S828.

In step S828, the CPU 201 determines whether a color image is included in the images of the document read in step S803. If a color image is included (YES in step S828), the processing proceeds to step S829. In step S829, the CPU 201 selects a sheet cassette that stores paper for color printing and of a size that matches the size of the image to be printed, and stores the information of the selected sheet cassette in the memory unit 206 as the information of the sheet cassette to be used for the printing. Then, the processing proceeds to step S822.

In step S822, the CPU 201 instructs the print unit 211 to print the image of the document read in step S803 on the paper for color printing fed from the selected sheet cassette. According to the instruction, the print unit 211 prints the image on the paper for color printing fed from the sheet cassette selected by the CPU 201, and then the processing ends.

On the other hand, in step S828, if a color image is not included in the images of the document read in step S803 (NO in step S828), the processing proceeds to step S830. In step S830, the CPU 201 selects a sheet cassette that stores paper for monochromatic printing and of a size that matches the size of the image to be printed, and stores the information of the selected sheet cassette in the memory unit 206 as the information of the sheet cassette to be used for the printing.

In step S822, the CPU 201 instructs the print unit 211 to print the image of the document read in step S803 on the paper for monochromatic printing fed from the selected sheet cassette. According to the instruction, the print unit 211 prints the image on the paper for monochromatic printing fed from the sheet cassette selected by the CPU 201, and then the processing ends.

In step S827, if both the auto paper selection function and the auto color selection function are enabled and, further, if a plurality sheets is necessary for the printing, the processing proceeds to step S810. In step S810, the CPU 201 displays a screen 1101 illustrated in FIG. 7A on the touch panel unit 902. Via the screen 1101, the CPU 201 notifies the user that both the auto paper selection function and the auto color selection function are enabled. Additionally, the CPU 201 notifies the user that since both the auto paper selection function and the auto color selection function are enabled, the paper for color printing and the paper for monochromatic printing may be included in a mixed manner in the printed output when a job is executed.

For example, a job for copying a six-page document will be described as an example. The images of the first to the fourth pages of the document are color images and the images of the fifth and the sixth pages are monochromatic images. In this case, according to the auto color selection function, the CPU 201 determines that the first to the fourth pages are color images and the fifth and the sixth pages are monochromatic images. Then, by using the auto paper selection function, the CPU 201 prints the images of the first to the fourth pages on the paper for color printing and the images of the fifth and the sixth pages on the paper for monochromatic printing.

Thus, according to the MFP 100 of the present embodiment, when the documents include color and monochromatic images, the image of the color document is printed on the paper for color printing. Thus, printed output of enhanced image quality can be obtained. Further, since the image of the monochromatic document is printed on the paper for monochromatic printing, the cost of paper can be reduced. However, depending on the purpose of use of the printed output, such as paper handed out to customers and reference materials distributed at meetings, the user may not desire to have the paper for color printing and the paper for monochromatic printing in a mixed manner in the printed output of one job or one set of printed output. Thus, according to the MFP 100 of the present embodiment, the user is notified of the possibility of the mixed paper in step S810 before a job is executed so that the user can select the subsequent processing.

Figure 7A:
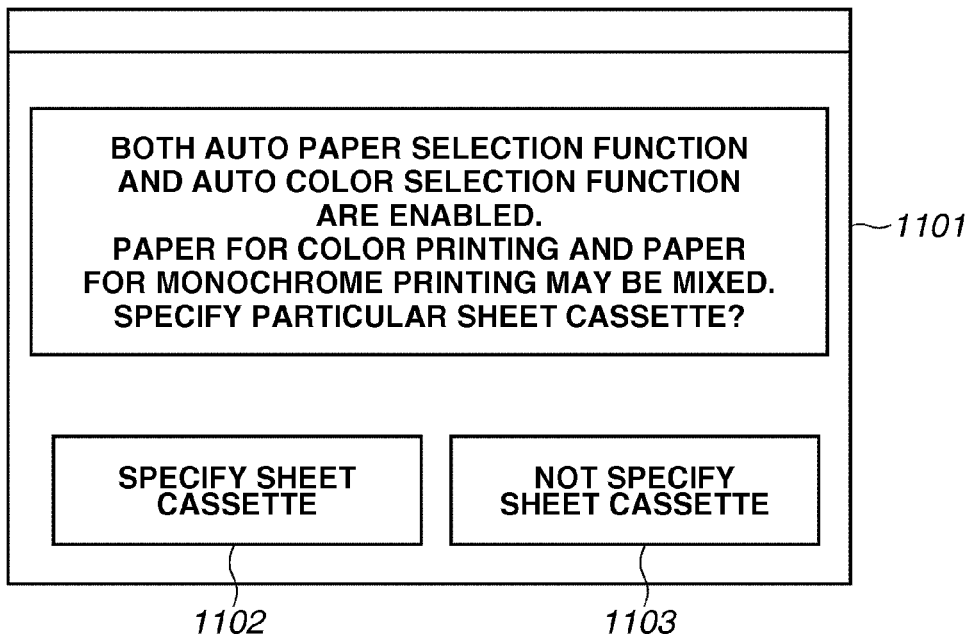
FIGS. 7A and 7B illustrate an operation screen according to the exemplary embodiment.

In step S811, when the user recognizes that there is a possibility for mixed paper according to the screen 1101 in FIG. 7A, the user determines whether to designate a particular sheet cassette to prevent the mixed paper. If the user selects a key 1102, printing is performed only on paper fed from a particular sheet cassette. Thus, paper for color printing and paper for monochromatic printing will not be mixed.

In step S811, if the CPU 201 determines that the user has selected the key 1102 (YES in step S811), the processing proceeds to step S812. In step S812, the CPU 201 displays the paper selection screen 508 illustrated in FIG. 4B on the touch panel unit 902. Then, the user is asked to select one cassette from the sheet cassettes 1 to 4 via the paper selection screen 508 in FIG. 4B. When the paper selection screen 508 is displayed, the CPU 201 can also display information of whether paper for color printing or monochromatic printing is stored in each of the sheet cassettes 1 to 4. This information will be useful for the user when the user selects the printing paper to be used for the printing.

In step S813, when the user designates a sheet cassette via the paper selection screen 508 in FIG. 4B, the CPU 201 stores, in the memory unit 206, the information of the selected sheet cassette as the information of the sheet cassette to be used for the printing. In step S822, the CPU 201 instructs the print unit 211 to print the image of the document read in step S803 on the paper fed from the sheet cassette selected by the user via the screen 508 in FIG. 4B. According to the instruction, the print unit 211 prints the image on the paper fed from the sheet cassette selected by the CPU 201, and then the processing ends.

Referring back again to the screen 1101 in FIG. 7A, if the user does not desire to select a particular sheet cassette, the user selects a key 1103 on the screen 1101. Then, the CPU 201 determines that the user has not selected the key 1102 (NO in step S811), and the processing proceeds to step S814. In step S814, the CPU 201 displays a screen 1104 illustrated in FIG. 7B on the touch panel unit 902.

In step S815, the CPU 201 determines whether the paper for color printing and the paper for monochromatic printing can be used in a mixed manner. The screen 1104 illustrated in FIG. 7B includes a mix key 1105 and a non-mix key 1106. If the user desires to print a color image on paper for color printing and a monochromatic image on paper for monochromatic printing, that is, if the user allows mixed paper, the user selects the mix key 1105. On the other hand, if the user does not desire to mix paper for color printing and paper for monochromatic printing, the user selects the non-mix key 1106.

Figure 7B:
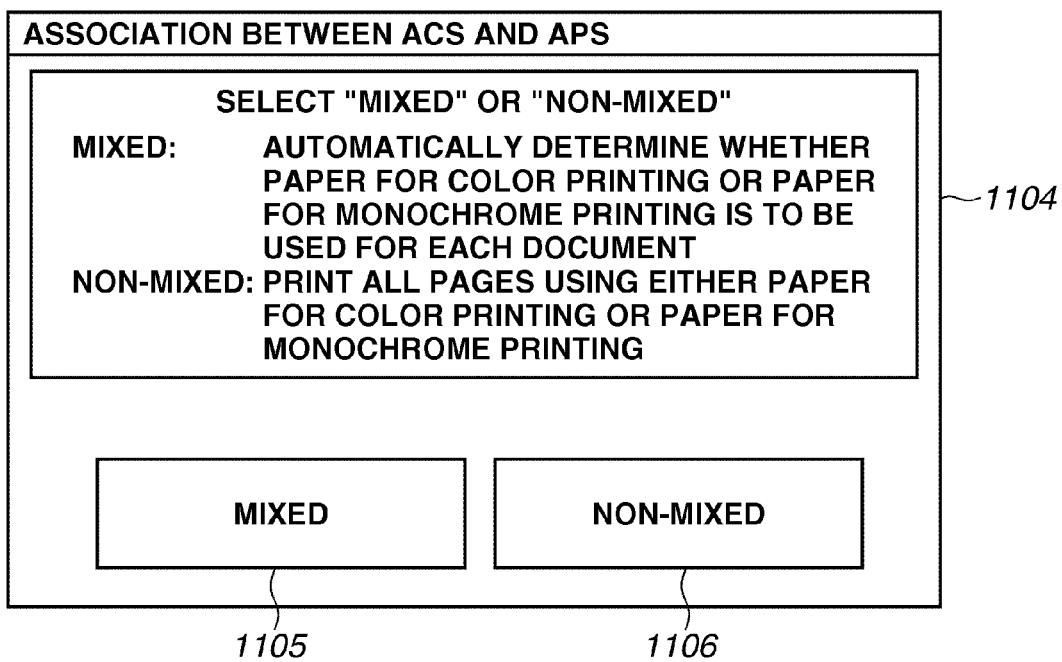

In step S815, if the user selects the mix key 1105 on the screen 1104 illustrated in FIG. 7B (YES in step S815), the processing proceeds to step S816.

Figure 8A:
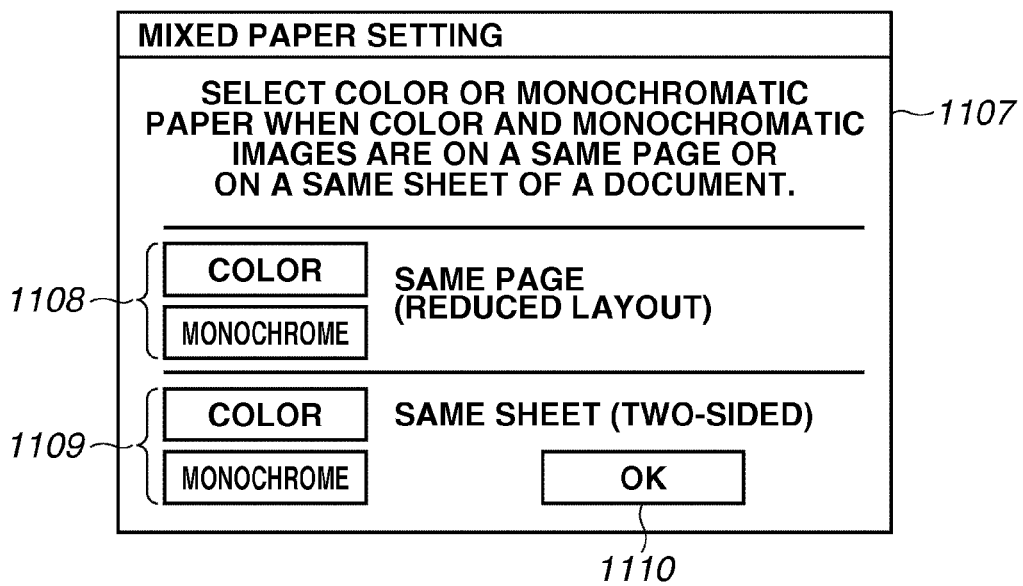
FIGS. 8A and 8B illustrate an operation screen according to the exemplary embodiment.

In step S816, the CPU 201 displays a screen 1107 in FIG. 8A on the touch panel unit 902. This screen is used for selecting either the paper for color printing or the paper for monochromatic printing when both a color image and a monochromatic image are to be printed on one sheet of paper.

A color image and a monochromatic image are printed on one sheet of paper when, for example, a six-page document is printed by 2-in-1 printing using reduced layout function. If the first to the third pages are color images and the fourth to the sixth pages are monochromatic images, since the images of the first and the second pages are color images, these images are printed on the paper for color printing by reduced printing. Further, since the images of the fifth and the sixth pages are monochromatic images, these images are printed on the paper for monochromatic printing by reduced printing. However, since the image of the third page is a color image and the image of the fourth page is a monochromatic image, if these images are printed by 2-in-1 printing, a color image and a monochromatic image will be printed on the same sheet. In such a case, the CPU 201 determines whether to print the images of the third and the fourth pages on paper for color printing or paper for monochromatic printing via the screen 1107.

In step S816, when the user selects either a "color" key or a "monochromatic" key in a key group 1008, the CPU 201 accepts the result of the selection. Further, when the user selects an OK button 1110, the processing proceeds to step S817. In step S817, the CPU 201 stores the content of the setting in the memory unit 206. In step S818, the CPU 201 executes the printing according to the content of the setting.

Next, the print control performed by the CPU 201 when the "color" key is selected from the key group 1008 will be described. The above-described six-page document having color images on the first to the third pages and monochromatic images on the fourth to the sixth pages and printed by 2-in-1 printing after using the reduced layout function will be used as an example. The CPU 201 arranges the images of the first and the second pages on a same side of a first sheet. Since these images are color images, the CPU 201 instructs the print unit 211 to print the images on the paper for color printing.

Next, the CPU 201 arranges the images of the third and the fourth pages on a same side of a second sheet. Since the third image is a color image and the fourth image is a monochromatic image, the CPU 201 references the screen in FIG. 8A and determines whether the color key or the monochromatic key has been selected by the user. If the CPU 201 determines that the color key has been selected, the CPU 201 instructs the print unit 211 to print the images on the paper for color printing.

Further, the CPU 201 arranges the images of the fifth and the sixth pages on a same side of a third sheet. Since these images are monochromatic images, the CPU 201 instructs the print unit 211 to print the images on the paper for monochromatic printing.

According to the instruction sent from the CPU 201, the print unit 211 feeds the paper for color printing as the paper for the first sheet, and prints the images of the first and the second pages on the paper which has been fed. Next, the print unit 211 feeds the paper for color printing as the paper for the second sheet, and prints the images of the third page and the fourth pages on the paper which has been fed. Further, the print unit 211 feeds the paper for monochromatic printing as the paper for the third sheet, and prints the images of the fifth and the sixth pages on the paper which has been fed.

On the other hand, if the user selects the monochromatic key, the images of the first and the second pages will be printed on the paper for color printing, the images of the third and the fourth pages will be printed on the paper for monochromatic printing, and the images of the fifth and the sixth pages will be printed on the paper for monochromatic printing.

Further, as a different example of a color image and a monochromatic image printed on one sheet of paper, there is a case where a six-page document having color images on the first to the third pages and monochromatic images on the fourth to the sixth pages is printed by two-sided printing. In this case, since the images of the first and the second pages are color images, these images are printed by two-sided printing on the paper for color printing. Further, since the images of the fifth and the sixth pages are monochromatic images, these images are printed by two-sided printing on the paper for monochromatic printing. However, since the image of the third page is a color image and the image of the fourth page is a monochromatic image, if these images are printed by two-sided printing, a color image and a monochromatic image will be printed on one sheet of paper. In this case, the CPU 201 determines whether the images on the third and the fourth pages are to be printed on the paper for color printing or the paper for monochromatic printing according to the content set via the screen 1107.

In step S816, when the user selects either a "color" key or a "monochromatic" key in a key group 1009, the CPU 201 accepts the result of the selection. Further, when the user selects an OK button 1110, the processing proceeds to step S817. In step S817, the CPU 201 stores the content of the setting in the memory unit 206. In step S818, the CPU 201 executes the printing according to the content of the setting.

Next, the print control performed by the CPU 201 when the color key is selected from the key group 1009 will be described. The above-described six-page document having color images on the first to the third pages and monochromatic images on the fourth to the sixth pages and printed by two-sided printing will be used as an example. The CPU 201 arranges the images of the first and the second pages on the different sides of a first sheet. Since these images are color images, the CPU 201 instructs the print unit 211 to print the images on the paper for color printing by two-sided printing.

Next, the CPU 201 arranges the images of the third and the fourth pages on the different sides of a second sheet. Since the third image is a color image and the fourth image is a monochromatic image, the CPU 201 references the screen in FIG. 8A and determines whether the color key or the monochromatic key has been selected by the user. If the CPU 201 determines that the color key has been selected, the CPU 201 instructs the print unit 211 to print the images on the paper for color printing by two-sided printing.

Further, the CPU 201 arranges the images of the fifth and the sixth pages on the different sides of a third sheet. Since these images are monochromatic images, the CPU 201 instructs the print unit 211 to print the images on the paper for monochromatic printing.

According to the instruction sent from the CPU 201, the print unit 211 feeds the paper for color printing as the paper for the first sheet, and prints the image of the first page on the front surface and the image of the second page on the back surface. Next, the print unit 211 feeds the paper for color printing as the paper for the second sheet, and prints the image of the third page on the front surface and the image of the fourth page on the back surface. Further, the print unit 211 feeds the paper for monochromatic printing as the paper for the third sheet, and prints the image of the fifth page on the front surface and the image of the sixth page on the back surface.

On the other hand, if the user selects the monochromatic key, the print unit 211 feeds the paper for color printing as the paper for the first sheet, and prints the image of the first page on the front surface and the image of the second page on the back surface. Next, the print unit 211 feeds the paper for monochromatic printing as the paper for the second sheet, and prints the image of the third page on the front surface and the image of the fourth page on the back surface. Further, the print unit 211 feeds the paper for monochromatic printing as the paper for the third sheet, and prints the image of the fifth page on the front surface and the image of the sixth page on the back surface.

Next, a case where the user selects the non-mix key 1106 on the screen 1104 illustrated in FIG. 7B will be described.

In step S815, if the user does not desire to mix paper for color printing and paper for monochromatic printing, the user selects the non-mix key 1106 on the screen 1104 in FIG. 7B (NO in step S815), and the processing proceeds to step S819. In step S819, the CPU 201 displays a screen 1111 illustrated in FIG. 8B on the touch panel unit 902.

The screen 1111 includes a group of keys 1112 to 1114, a group of keys 1119 and 1120, an entry field 1118, and an OK button 1117. Each of the group of keys 1112 to 1114 is exclusively selected. Further, each of the group of keys 1119 and 1120 is exclusively selected. If the user selects the key 1113, the user also needs to select one key from the group of keys 1119 and 1120.

If the user selects the key 1112, when the first page of a document is a color image, the images of all the pages of the document will be printed on the paper for color printing. Further, if the first page of the document is a monochromatic image, the images of all the pages of the document will be printed on the paper for monochromatic printing. In step S820, if the user selects the OK button 1117 after selecting the key 1112, the CPU 201 stores, in the memory unit 206, the information indicating that the key 1112 has been selected.

In step S821, the CPU 201 determines whether the image of the first page of the document which has been read is a color image. If the image of the first page is a color image, the CPU 201 determines that the sheet cassette which stores the paper for color printing is the sheet cassette to be used for the auto paper selection function, and sends a print instruction to the print unit 211. If the sheet cassette is selected based on the table illustrated in FIG. 9B, the sheet cassettes 1 and 2 will be the sheet cassettes to be used for the auto paper selection. In this case, regardless of whether the images on and after the second page of the document are color or monochromatic images, the print unit 211 feeds paper from the sheet cassette 1 or 2 where the paper for color printing is stored, and prints the images on the paper for color printing which has been fed.

According to the example illustrated in FIG. 9B, if the image size of the document is A4, the sheet cassette 1 will be selected. If the image size of the document is A3, the sheet cassette 2 will be selected. If a plurality of cassettes storing paper of a same size and of a same type (paper for color printing or paper for monochromatic printing) exists, the sheet cassette having the shortest conveyance path to the imaging unit 403 will be selected.

On the other hand, if the image of the first page is a monochromatic image, the CPU 201 determines that the sheet cassette which stores the paper for monochromatic printing is the sheet cassette to be used for the auto paper selection function, and sends a print instruction to the print unit 211. If the sheet cassette is selected based on the table illustrated in FIG. 9B, the sheet cassette 3 will be the target of the auto paper selection function. Since the sheet cassette 4 is not set as a target of the auto paper selection function, it is not selected for the auto paper selection.

In this case, regardless of whether the images on and after the second page of the document are color or monochromatic images, the print unit 211 feeds paper from the sheet cassette 3 where the paper for monochromatic printing is stored, and prints the images on the paper for monochromatic printing which has been fed. According to the example illustrated in FIG. 9B, if the image size of the document is A4, the sheet cassette 3 will be selected. If the image size of the document is A3, a message indicating that a sheet cassette storing A3-size paper is not available will be displayed on the touch panel unit 902. If a plurality of cassettes storing paper of a same size and of a same type (paper for color printing or paper for monochromatic printing) exists, sheet cassette having the shortest conveyance path to the imaging unit 403 will be selected.

The key 1113 is used on condition that both an image of a color page and an image of a monochromatic page are included in the images of the pages of a document. If the user selects the OK button 1117 after selecting the key 1113 and the key 1119, in step S820, the CPU 201 stores information indicating that the keys 1113 and 1119 have been selected in the memory unit 206.

In step S821, if images of both a color page and a monochromatic page are included in the images of a plurality of pages of a document, the CPU 201 controls the print unit 211 so that the images of all the pages of the document are printed on the paper for color printing. Further, if only color pages are included in the document, the CPU 201 controls the print unit 211 so that images of all the pages of the document are printed on the paper for color printing. Furthermore, if only monochromatic pages are included in the document, the CPU 201 controls the print unit 211 so that images of all the pages of the document are printed on the paper for monochromatic printing.

If the user selects the OK button 1117 after selecting the key 1113 and the key 1120, in step S820, the CPU 201 stores information indicating that the keys 1113 and 1120 have been selected in the memory unit 206.

In step S821, if images of both a color page and a monochromatic page are included in the images of a plurality of pages of a document, the CPU 201 controls the print unit 211 so that images of all the pages of the document are printed on the paper for monochromatic printing. Further, if only color pages are included in the document, the CPU 201 controls the print unit 211 so that images of all the pages of the document are printed on the paper for color printing. Furthermore, if only monochromatic pages are included in the document, the CPU 201 controls the print unit 211 so that images of all the pages of the document are printed on the paper for monochromatic printing.

The key 1114 is used for designating the paper for color printing to be used for the printing when the ratio of the color pages of the document to the total number of pages of the document exceeds X %. If the user selects the OK button 1117 after selecting the key 1114, in step S820, the CPU 201 stores information indicating that the key 1114 has been selected in the memory unit 206.

In step S821, the CPU 201 calculates the ratio of the number of the color pages to the number of the total pages of the images of the document. Then, if the CPU 201 determines that the ratio of the number of the color pages to the number of the total pages exceeds X %, the CPU 201 controls the print unit 211 so that the images of all the pages of the document are printed on the paper for color printing. On the other hand, if the CPU 201 determines that the ratio of the number of the color pages to the number of the total pages is X % or less, the CPU 201 controls the print unit 211 so that the images of all the pages of the document are printed on the paper for monochromatic printing. The value X is changeable. The user can input a numerical value using the numeric keypad 906 and change the value of X after designating the entry field 1118.

According to the above-described control, when both the auto color selection function and the auto paper selection function are designated, the user is able to know that a printed output including mixed paper may be output before the printing is started.

Then, if there is a possibility for the printed output including mixed paper, the user can set detailed settings described above according to the present embodiment.

Figure 8B:
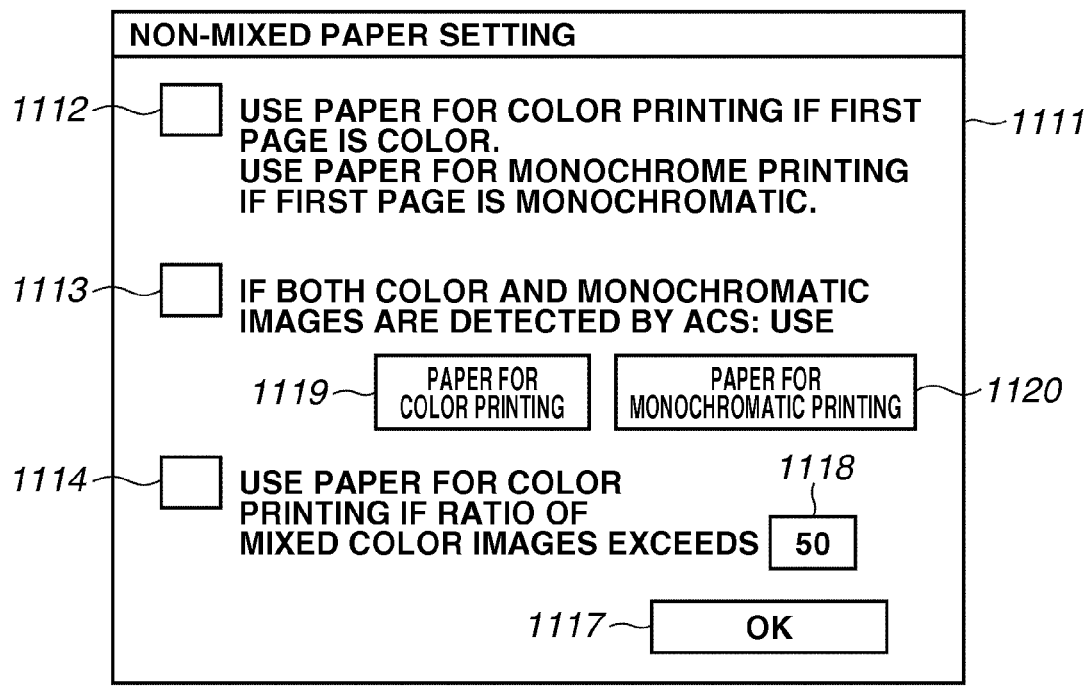

According to the above-described embodiment, if there is a possibility for a mixed printed output of paper for color printing and paper for monochromatic printing, the paper for color printing or the paper for monochromatic printing is selected according to the setting set via the screen illustrated in FIG. 8B. However, the present invention is not limited to such an example and the user can arbitrarily select whether to use the paper for color printing or the paper for monochromatic printing for a job.

If the user selects the paper for color printing as the paper to be used for the job, the CPU 201 controls the print unit 211 so that the images of all the pages to be printed when the job is executed will be printed on the paper for color printing. On the other hand, if the user selects the paper for monochromatic printing as the paper to be used for the job, the CPU 201 controls the print unit 211 so that the images of all the pages to be printed when the job is executed will be printed on the paper for monochromatic printing.

Further, according to the above-described embodiment, the printing of the image is started in step S822 after the reading of the document in step S803 is completed, however, the present invention is not limited to such an example.

For example, when the user presses the start key 905, if at least either the auto paper selection function or the auto color selection function is not set to enabled, the CPU 201 can perform the reading processing of the image of the document in parallel with the print processing of the image which has been read. On the other hand, when the user presses the start key 905, if both the auto paper selection function and the auto color selection function are set to enabled, the print processing will not be started until the reading processing of the image of the document is completed. The CPU 201 starts the print processing of the image when the reading processing of the image of the document is completed.

In this manner, if either the auto paper selection function or the auto color selection function is not enabled and if the sheet cassette to be used can be determined before the reading of the document having a plurality of pages is completed, the reading processing of the image of the document can be performed in parallel with the print processing of the image which has been read. Accordingly, productivity can be maintained.

Further, according to the above-described embodiment, if it is determined that a plurality of sheets is necessary for the printing in step S827, the processing proceeds to step S810. However, the processing can proceed directly from step S827 to step S814 without going through step S810. In this case, the display of the selection screen of mixed/non-mixed sheets in step S810 is skipped.

Further, according to the above-described embodiment, if both the auto paper selection function and the auto color selection function are enabled, the processing proceeds to step S827 according to the determination in steps S804 and S806. However, the present invention is not limited to such an example. For example, the processing may be configured such that the processing proceeds to step S827 only on condition that both the auto paper selection function and the auto color selection function are enabled and, further, the document includes both a color page and a monochromatic page.

On the other hand, even if both the auto paper selection function and the auto color selection function are enabled, if all the pages of the image data of the document are color pages, the CPU 201 selects the paper for color printing without performing the processing on and after step S827. Further, even if both the auto paper selection function and the auto color selection function are enabled, if all the pages of the image data of the document are monochromatic pages, the CPU 201 selects the paper for monochromatic printing without performing the processing on and after step S827. Thus, if the display of the screens illustrated in FIG. 7A and FIG. 7B is not necessary, display of the screens is prevented.

According to the above-described description, a copy job of the print unit 211, which prints an image of a document read by the scanner unit 207 has been described. However, the present invention is not limited to a copy job and, for example, the present invention can be applied to a print job of the print unit 211, which prints an image of print data sent from an external PC or a server and received via the NIC unit 208. In such a case, the CPU 201 receives the print data and the print setting set by the external PC or the server in step S803. The external PC can set items similar to those set on the screens illustrated in FIGS. 4A to 4C. Then, the CPU 201 instructs the image processing unit 204 to process the received print data, and the color type of the image data is determined by the color determination unit 213. Then, the CPU 201 performs the processing on and after step S804 according to the received print setting.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-006045, filed Jan. 16, 2012, which is hereby incorporated by reference herein in its entirety.

What is claimed is:

1. An image forming apparatus for conveying a sheet from any of a plurality of storage units and forming an image on the conveyed sheet, the apparatus comprising:

an executing unit configured to execute a job for forming an image on each of a plurality of sheets;

a determining unit configured to determine for each page whether the image which is to be formed on the plurality of sheets by the job executing unit is a color image or a monochromatic image;

a conveyance control unit configured to convey a sheet from a storage unit storing a sheet for color printing out of the plurality of storage units to form an image of a page determined as the color image by the determining unit and convey a sheet from a storage unit storing a sheet for monochromatic printing out of the plurality of storage units to form an image of a page determined as the monochromatic image by the determining unit; and a notifying unit configured to, if there is a possibility that a sheet is conveyed from both the storage unit storing the sheet for color printing and the storage unit storing the sheet for monochromatic printing by the conveyance control unit when the executing unit executes the job, notify a user of the possibility before the job is executed.

2. An image forming apparatus for conveying a sheet from any of a plurality of storage units and forming an image on the conveyed sheet, the apparatus comprising:

an executing unit configured to execute a job for forming an image on each of a plurality of sheets;

a determining unit configured to determine for each page whether the image which is to be formed on the plurality of sheets by the job executing unit is a color image or a monochromatic image; and a conveyance control unit configured to convey a sheet in a first conveyance mode or a second conveyance mode, the first conveyance mode being a mode for conveying a sheet from a storage unit storing a sheet for color printing out of the plurality of storage units to form an image of a page determined as the color image by the determining unit and conveying a sheet from a storage unit storing a sheet for monochromatic printing out of the plurality of storage units to form an image of a page determined as the monochromatic image by the determining unit, and the second conveyance mode being a mode for conveying a sheet from either the storage unit storing a sheet for color printing out of the plurality of storage units or the storage unit storing a sheet for monochromatic printing out of the plurality of storage units regardless of the determination of the determining unit, wherein if there is a possibility that the sheet is conveyed from both the storage unit storing a sheet for color printing and the storage unit storing a sheet for monochromatic printing in the first conveyance mode, the conveyance control unit conveys the sheet on which the image is formed by the job executing unit in either the first conveyance mode or the second conveyance mode according to an instruction given by a user.

3. An image forming apparatus according to claim 2, wherein the instruction given by the user includes an instruction for selecting a storage unit, and if an instruction for selecting the storage unit is accepted, the conveyance control unit conveys a sheet on which the image is to be formed by the job executing unit, from the selected storage unit according to the instruction.

4. An image forming apparatus according to claim 2, wherein the instruction includes an instruction for selecting whether the sheet for color printing or the sheet for monochromatic printing is to be used in forming the image of the page of the job, and wherein if use of the sheet for color printing is instructed, the conveyance control unit conveys a sheet from the storage unit storing a sheet for color printing out of the plurality of storage units in order to form the image of the page of the job and if use of the sheet for monochromatic printing is instructed, the conveyance control unit conveys a sheet from the storage unit storing a sheet for monochromatic printing out of the plurality of storage units in order to form the image of the page of the job.

5. An image forming apparatus according to claim 2, further comprising:

a first setting unit configured to set whether to enable an auto color selection function used for determining for each page whether the image to be formed by the job executing unit is a color image or a monochromatic image performed by the determining unit;

a second setting unit configured to set whether to enable a selection function used for selecting the storage unit to be used for each page according to information of the page; and a judging unit configured to judge that a sheet may be conveyed from both the storage unit storing the sheet for color printing and the storage unit storing the sheet for monochromatic printing by the job executing unit if the auto color selection function is enabled by the first setting unit and the selection function is enabled by the second setting unit.

6. An image forming apparatus according to claim 1, further comprising:

a first setting unit configured to set whether to enable an auto color selection function used for determining for each page whether the image to be formed by the job executing unit is a color image or a monochromatic image, by the determining unit;

a second setting unit configured to set whether to enable a selection function used for selecting the storage unit to be used for each page according to information of the page; and a judging unit configured to judge that a sheet may be conveyed from both the storage unit storing the sheet for color printing and the storage unit storing the sheet for monochromatic printing by the job executing unit if the auto color selection function is enabled by the first setting unit and the selection function is enabled by the second setting unit.

7. An image forming apparatus according to claim 1, further comprising a reading unit configured to read an image of a document, wherein the executing unit executes a job for forming the image read by the reading unit on the sheet.

8. An image forming apparatus according to claim 1, further comprising a receiving unit configured to receive the image from an external apparatus via a network, wherein the executing unit executes a job for forming the image received by the receiving unit on the sheet.

9. A control method for controlling an image forming apparatus for conveying a sheet from any of a plurality of storage units and forming an image on the conveyed sheet, the method comprising:

executing a job for forming an image on each of a plurality of sheets;

determining for each page whether the image formed on the plurality of sheets by the job executing unit is a color image or a monochromatic image;

conveying a sheet from a storage unit storing a sheet for color printing out of the plurality of storage units to form an image of a page determined as the color image and convey a sheet from a storage unit storing a sheet for monochromatic printing out of the plurality of storage units to form an image of a page determined as the monochromatic image; and if there is a possibility that a sheet is conveyed from both the storage unit storing the sheet for color printing and the storage unit storing the sheet for monochromatic printing by executing the job, notifying a user of the possibility before the job is executed.

10. A non-transitory computer readable storage medium for storing a computer program for controlling an image forming apparatus for conveying a sheet from any of a plurality of storage units and forming an image on the conveyed sheet, the computer program comprising:

a code to execute a job for forming an image on each of a plurality of sheets;

a code to determine for each page whether the image formed on the plurality of sheets by the job executing unit is a color image or a monochromatic image;

a code to convey a sheet from a storage unit storing a sheet for color printing out of the plurality of storage units to form an image of a page determined as the color image and convey a sheet from a storage unit storing a sheet for monochromatic printing out of the plurality of storage units to form an image of a page determined as the monochromatic image; and if there is a possibility that a sheet is conveyed from both the storage unit storing the sheet for color printing and the storage unit storing the sheet for monochromatic printing by executing the job, a code to notify a user of the possibility before the job is executed.

* * * * *